US006172709B1

(12) United States Patent
Yamano et al.

(10) Patent No.: US 6,172,709 B1
(45) Date of Patent: Jan. 9, 2001

(54) DETACHABLE LENS BLOCK AND VIDEO CAMERA SYSTEM INCLUDING THE SAME

(75) Inventors: Shiro Yamano, Tokyo; Mitsuyoshi Koizumi, Kanagawa; Makoto Amano, Kanagawa; Akira Tamura, Kanagawa, all of (JP)

(73) Assignees: Yamamo Optical, Ltd., Machida; Hitachi Video and Information System, Inc., Yokohama, both of (JP)

( * ) Notice: Under 35 U.S.C. 154(b), the term of this patent shall be extended for 0 days.

(21) Appl. No.: 08/990,089

(22) Filed: Dec. 12, 1997

(30) Foreign Application Priority Data

Aug. 26, 1997 (JP) .................................................. 9-229650

(51) Int. Cl.[7] .................................................. H04N 5/232
(52) U.S. Cl. .......................... 348/360; 348/335; 348/345; 348/363
(58) Field of Search .................................... 348/335, 340, 348/360, 362, 363, 364, 345, 346, 347; 396/529, 530, 531, 544, 71, 80; 352/142

(56) References Cited

U.S. PATENT DOCUMENTS

| | | | |
|---|---|---|---|
| 5,068,680 | * 11/1991 | Kawasaki et al. | 396/71 |
| 5,128,704 | * 7/1992 | Hayashi et al. | 396/543 |
| 5,157,431 | * 10/1992 | Mabuchi et al. | 396/80 |
| 5,402,174 | * 3/1995 | Takahashi | 348/347 |
| 5,434,637 | * 7/1995 | Ohta | 396/529 |
| 5,625,415 | * 4/1997 | Ueno et al. | 348/346 |
| 5,799,214 | * 8/1998 | Iwane | 396/135 |
| 5,847,756 | * 12/1998 | Iura et al. | 348/363 |
| 5,877,811 | * 3/1999 | Iijima et al. | 396/71 |
| 5,946,504 | * 8/1999 | Hirasawa et al. | 396/80 |

FOREIGN PATENT DOCUMENTS

| | | | | |
|---|---|---|---|---|
| 406197253 | * 7/1994 | (JP) | | H04N/5/232 |
| 008279950 | * 10/1996 | (JP) | | H04N/5/232 |

* cited by examiner

Primary Examiner—Wendy Garber
Assistant Examiner—Mitchell White
(74) Attorney, Agent, or Firm—Oblon, Spivak, McClelland, Maier & Neustadt, P.C.

(57) ABSTRACT

A video camera system comprises a lens block and a camera block which are attachable and detachable through a block coupling mechanism to and from each other. The detachable lens block incorporates a focus lens drive mechanism for driving a focus lens and an autofocus control section for executing autofocus control. The autofocus control section receives a composite video signal obtained by processing a video signal from an image pickup device in a signal processing section of the camera block. The autofocus control section produces a focus control signal on the basis of the composite video signal to control the focus lens drive mechanism for the execution of the autofocus control. In addition, the detachable lens block is composed of an iris drive mechanism for optically adjusting an aperture of a lens and an autoiris control section for automatically controlling the iris drive mechanism, so that automatic iris control is executed on the basis of the composite video signal outputted from the camera block. This video camera system can decrease the number of connecting lines to be provided between the detachable lens block and the camera block.

7 Claims, 5 Drawing Sheets

PRIOR ART

DETACHABLE LENS BLOCK AND VIDEO CAMERA SYSTEM INCLUDING THE SAME

BACKGROUND OF THE INVENTION

1. Field of the Invention

The present invention relates to a detachable lens block attachable and detachable to and from a camera block including an image pickup device and a video (picture) signal processing circuit, and more particularly to a detachable lens block equipped with at least an autofocus control function and a video camera system based upon the same.

2. Description of the Related Art

In a video camera system having an integral construction of a camera block and a lens block, in general an autofocus control function is provided to automatically accomplish the in-focus condition with respect to a subject. Particularly, in the case of a monitoring type video camera system, this function is available.

Japanese Examined Patent Publication No. 39-5265 discloses one example of video camera systems having such an autofocus control function. Referring to a schematic block diagram of FIG. 5, a description will be made hereinbelow of the arrangement of this prior example.

Figure 5:
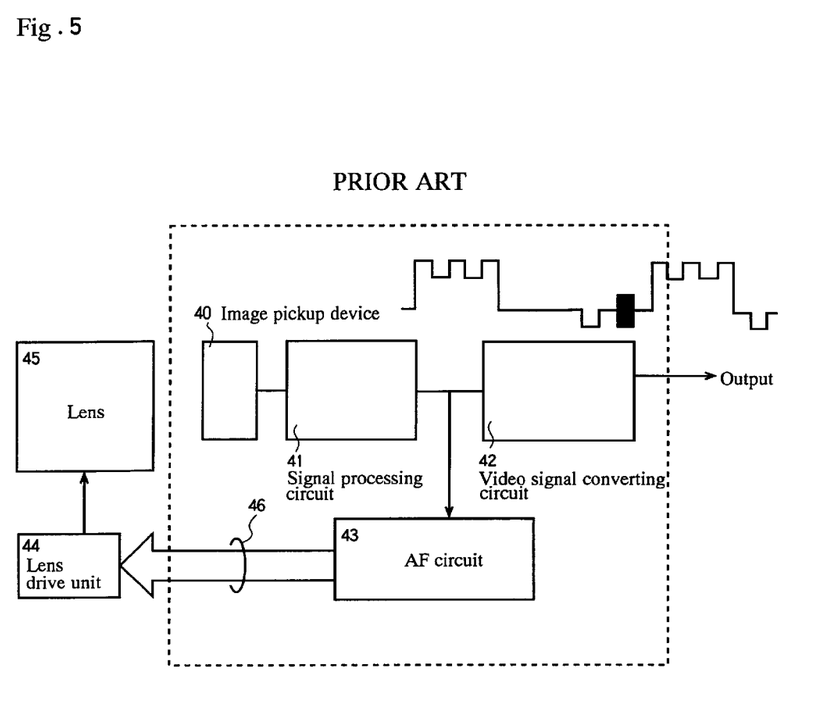
FIG. 5 is a block diagram showing a video camera system including a prior lens block.

In FIG. 5, a subject image coming through an optical lens 45 is incident on an image pickup device 40 to be converted into an electric signal serving as a video signal. This video signal is processed in a signal processing circuit 41 comprising a preamplifier and a process amplifier and then given to a video signal converting circuit 42 where, through processing such as the addition of a synchronizing signal and the synthesis of a color-difference signal, the video signal is converted into a composite video signal meeting the standard mode such as NTSC and PAL.

On the other hand, the video signal outputted from the signal processing circuit 41 is also fed to an AF (autofocus control) circuit 43. This AF circuit 43 is composed of a differentiating circuit for detecting a rising edge of the video signal and a peak (maximum) point detecting circuit to produce a focus control signal indicative of the degree of the in-focus condition. This focus control signal is forwarded to a lens drive unit 44 which is for the purpose of moving the optical lens 45 in its optical-axis directions in accordance with the focus control signal (in Japanese Examined Patent Publication No. 39-5265, the image pickup device 40 is shifted in the optical-axis directions of the optical lens 45), and which is made up of a mechanism section such as a motor and gears, a servo amplifier for creating a motor drive signal on the basis of the focus control signal, and others.

In this arrangement, the AF circuit 43 monitors the amplitude of the rising edge of a video signal and outputs, to the lens drive unit 44, a focus control signal for the movement of the optical lens 45 in the direction that this amplitude increases. When the amplitude of the rising edge of the video signal reaches the peak point due to the movement of the optical lens 45, a decision is made to the in-focus condition, thus stopping the optical lens 45.

Furthermore, Japanese Examined Patent Publication No. 7-54969 discloses another example of video camera systems having an autofocus feature, where a focusing lens is oscillated in a narrow range in its optical-axis directions in accordance with a high-frequency reference signal so that the decision on the in-focus condition is made on the basis of the relation in phase between the component (oscillation component) due to the oscillation, included in a video signal outputted from an image pickup device, and the reference signal or a decision is made on the direction of moving an optical lens to assume the in-focus condition.

Accordingly, the aforesaid oscillation component is extracted from the video signal outputted from the image pickup device and processed in a preamplifier. The extracted oscillation signal is detected in synchronism with the aforesaid reference signal to detect the phase relation between the oscillation component and the reference signal, thereby deciding the direction of the movement of the optical lens for the in-focus condition. If the optical lens moves to pass through the in-focus point, the phase of the oscillation component is inverted, which allows the detection of the in-focus condition.

In the recent situation, in addition to the above-mentioned autofocus control function, the prior video camera systems have been equipped with an automatic iris control function which controls the iris in accordance with the fluctuation of brightness in the camera-using place so that a video signal with a constant intensity is always obtainable and further provided with a zoom control function, thereby achieving the easier-to-use of the system and providing higher-quality picture.

Furthermore, preferably the video camera systems has a structure which allows the interchange between optical lenses having different zooming magnifications. Particularly, in the case of an observational type video camera system, it is necessary to use an optical lens having a zooming magnification conforming with the environment (for example, the area of the monitoring space) in the camera-using place.

For meeting this requirement, it is considered that the video camera system is attachably and detachably divided into a block comprising a camera (which will be referred hereinafter to as a camera block) and a block including an optical lens (which will be referred hereinafter to as a lens block).

Referring again to FIG. 5, a brief description will be made hereinbelow of the division of this video camera system.

In FIG. 5, the camera block is a portion surrounded by a dotted line, including the image pickup device 40, the signal processing circuit 41, the video signal converting circuit 42 and the AF circuit 43, whereas the lens block is the other portion including the optical lens 45 and the lens drive unit 44. The camera block and the lens block are attachable and detachable, for example, through the use of a screw coupling construction (C mount or CS mount).

However, this division structure causes the following problems, which will be mentioned with reference to FIG. 5.

First, a large number of connecting lines need to be placed between the camera block and the lens block.

That is, control lines 46 are necessary for sending a focus control signal from the AF circuit 43 to the lens drive unit 44. As the control lines 46, required are two lines: a transmission line for sending a control signal to move the optical lens in the infinitely far-end direction and a transmission line for feeding a control signal to shift it in the near-end direction. In addition, when the optical lens 45 reaches the infinitely far end or near end, there is a need to detect this fact and to forward an end detection signal to the AF circuit 43 for stopping the output of the focus control signal. For this reason, it is necessary to place two transmission lines for one of the infinitely far-end detection signal and the near-end detection signal, i.e., four in total (three when one is used in common), to send these end detection signals from the lens block to the AF circuit 43. Further, one power supply line and one grounding line are necessary for supplying a power voltage from the camera block side to the lens drive unit 44 of the lens block. In consequence, the equipment of the autofocus control function requires at least 7 or 8 connecting lines 46.

Moreover, if the camera system is additionally equipped with the iris control function and the zoom control function, the connecting lines further increases in number. In this case, although not shown in FIG. 5, an iris control circuit for producing an iris control signal is placed on the camera block side while an iris drive unit is located on the lens block side, and therefore, one transmission line becomes necessary for sending this iris control signal. In addition, it is necessary to detect that the iris takes the maximum and minimum open conditions and further to send maximum/minimum iris open detection signals, which stop the output of the iris control signal from the iris control circuit, to an iris control system at the time of the detection. Accordingly, two transmission lines become necessary. That is, the iris control requires three connecting lines in total.

Furthermore, in the case of an observational type video camera system, a zoom adjusting signal is once forwarded from an external controller to the camera block so that a zoom control signal is created on the basis of this zoom adjusting signal and fed to the lens block. In addition, when the zoom lens is at the telephoto end or the wide-angle end, an end detection signal is generated to be sent to the camera block, thereby inhibiting the generation of the zoom control signal. For this reason, as the connecting lines for the zoom control, required are one transmission line for the zoom control signal and four transmission lines for the end detection signals indicative of the fact that the zoom lens reaches the telephoto end and the wide-angle end (three when one is used in common). Thus, the zoom control requires four or five connecting lines.

As described above, if providing the autofocus control function, the iris control function and the zoom control function to the video camera system, at least 14 to 16 connecting lines become necessary between the camera block and the lens block. In general, the connecting lines are bundled and connected through connectors to the camera block and the lens block to be placed therebetween. However, if the number of connecting lines increases, not only the connectors enlarge in size but also the bundle of the connecting lines extremely increases in diameter. Particularly, considering that it is desired to reduce the size of the video camera system by the size-reduction of the camera block and the lens block, the large-diameter connecting line bundle and large-sized connectors are not preferable as products, and hence, difficulty is encountered to actually put it as a product into production.

In the second place, in video camera systems, in general the camera lens sections are produced by optic manufacturers, whereas the camera bodies are produced by the electronic makers. In the case of attachably and detachably dividing the video camera system shown in FIG. 5 into the lens block and the camera block, the camera block is designed and produced by an electronic manufacturer while the lens block is designed and produced by an optic maker. Further, the user can desire various kinds of lens blocks having different magnifications, autofocus control functions, iris control functions and zoom control functions, and therefore, for satisfying such structural requirements it is preferable that different kinds of lens blocks are mountable onto one camera block. In the case of the video camera systems, it has advantage of the kind of the lens block being selected in accordance with the environment or the like in the camera-locating place.

However, different kinds of lens blocks have different characteristics from one another. Even if lens blocks are the same kind, lens blocks made by different makers have slightly different characteristics from one another. Accordingly, in cases where the selected lens block is set to the camera block, there is a possibility that the circuit characteristics of the lens drive unit, for example, of the lens block does not sufficiently match with the circuit characteristics of the AF circuit of the camera block, so that the desired function does not satisfactorily work.

For instance, in FIG. 5, in the case of the division of the video camera system mentioned above, for the lens block, the optic maker sets the optical characteristic of the optical lens 45 and further sets the circuit characteristic of the lens drive unit 44 in accordance with the movement characteristic at the focus control, whereas for the camera block the electronic maker makes the AF circuit 43 have the circuit characteristic agreeing with a video signal with a standardized level from the signal processing circuit 41. However, if this lens block is attached to the camera block, the focus control signal from the AF circuit 43 does not always coincide with the focus control signal, the lens drive unit 44 needs, with a high accuracy, with the result that a difference can occur between the lens blocks to be put to use.

SUMMARY OF THE INVENTION

Accordingly, it is an object of the present invention to provide a detachable lens block and a video camera system based upon the detachable lens block which are capable of not only sharply decreasing the number of connecting lines, but also easily coping with the system size-reduction and even enhancing the control functions to a high accuracy.

For this purpose, in accordance with the present invention, a detachable lens block comprises a focus lens drive mechanism and an autofocus control section, and the autofocus control section receives a view signal outputted from a camera block to control the focus lens drive mechanism on the basis of the video signal, thereby accomplishing the autofocus control.

With this arrangement, the connecting lines extending from the camera block to the detachable lens block are limited to a transmission line for supply of the video signal, a power supply line and a grounding line, so that the number of connecting lines necessary decreases. In addition, since the autofocus control feature is built in the lens block, this feature naturally matches with the optical characteristic and movement characteristic of the focus lens, thus achieving a high-accuracy autofocus control characteristic.

BRIEF DESCRIPTION OF THE DRAWINGS

The object and features of the present invention will become more readily apparent from the following detailed description of the preferred embodiment taken in conjunction with the accompanying drawings in which.

DETAILED DESCRIPTION OF THE INVENTION

An embodiment of the present invention will be described hereinbelow with reference to the drawings.

Figure 1:
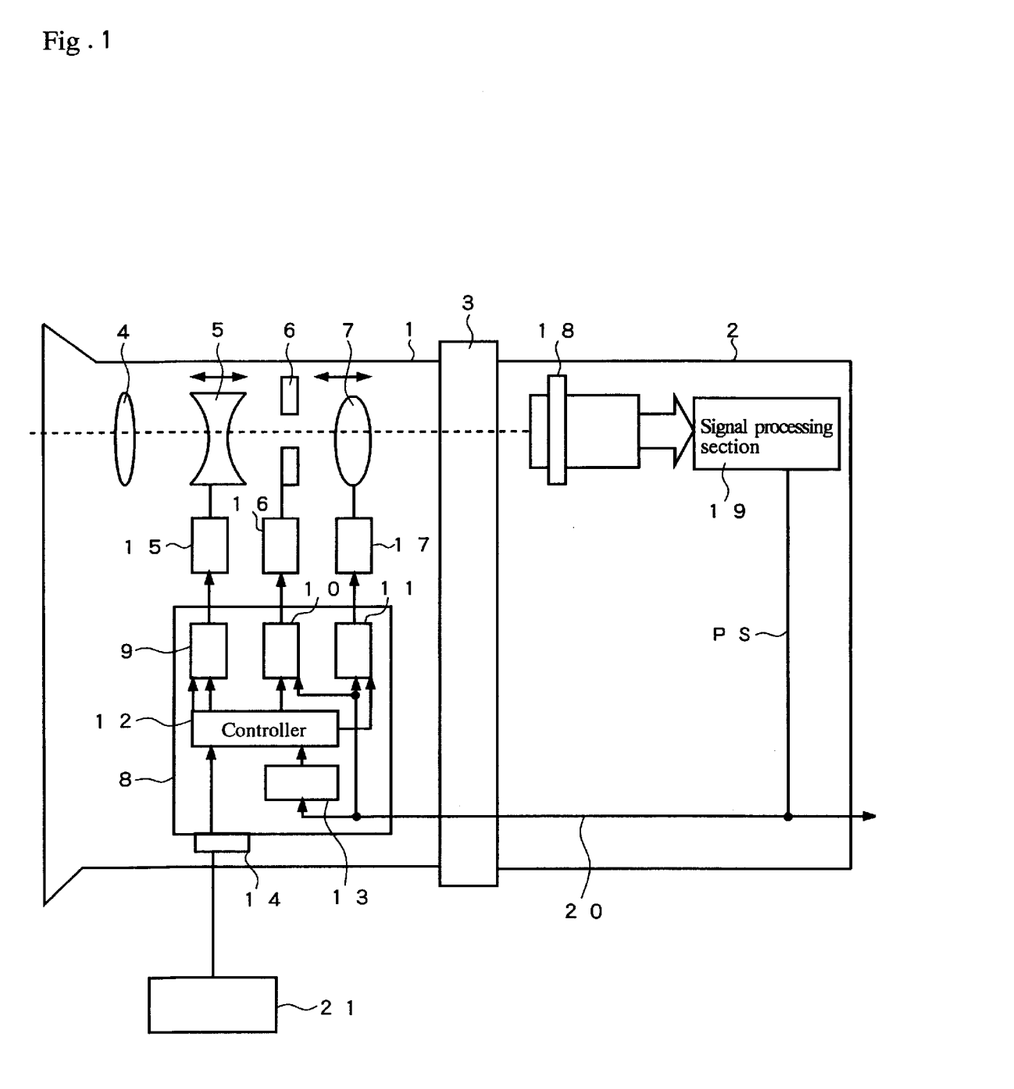
FIG. 1 is a block diagram showing a video camera system including a detachable lens block according to an embodiment of the present invention.

FIG. 1 is a block diagram showing a video camera system including a detachable lens block according to an embodiment of the present invention. In FIG. 1, the video camera system comprises a detachable lens block (which will be referred hereinafter to as a lens block) 1, a camera block 2 and a block coupling mechanism 3. The lens block 1 includes a front lens 4, a zoom lens 5, an iris 6, a focus lens 7, a control circuit section 8, a zoom control circuit 9, an iris control circuit 10, a focus control circuit 11, a controller 12, a synchronizing-pulse separation circuit 13, an external control inputting connector 14, a zoom lens drive mechanism 15, an iris drive mechanism 16, and a focus lens drive mechanism 17. On the other hand, the camera block 2 includes an image pickup device 18 and a signal processing section 19. Also included in the video camera system are a video signal transmission line 20 and an external controller 21.

Although this embodiment relates to an observational type video camera system, this invention is not particularly limited to this system.

In the same illustration, the lens block 1 is separated from the camera block 2 but attachable thereto by means of the block coupling mechanism 3. The block coupling mechanism 3 is constructed to be, for example, a C mount or a CS mount, and the lens block 1 is joinable to the camera block 2 through the screw fitting.

In a state where the lens block 1 is in coupling condition to the camera block 2, a light beam from a subject passes through the front lens 4, zoom lens 5, iris 6 and focus lens 7 of the lens block 1 and then reaches the image pickup device 18 of the camera block 2 to form a subject image thereon, with this subject image being converted into a video signal being an electric signal which in turn, is given to the signal processing section 19. This signal processing section 19 comprises a preamplifier, a video signal converting circuit and others to process the inputted video signal to produce a composite video signal PS meeting the standard mode. This composite video signal PS is fed to a monitoring unit (not shown) and further forwarded through the video signal transmission line 20 to the control circuit section 8 of the lens block 1.

The control circuit section 8 is composed of the zoom control circuit 9, the iris control circuit 10, the focus control circuit 11, the controller 12 and the synchronizing-pulse separation circuit 13. The composite video signal PS supplied from the camera block 2 through the video signal transmission line 20 is fed to the iris control circuit 10 and the focus control circuit 11, and further to the synchronizing-pulse separation circuit 13 to separate synchronizing signals (vertical and horizontal synchronizing signals) which in turn, are given to the controller 12.

The controller 12 uses these synchronizing signals as timing signals to control the operations of the zoom control circuit 9, the iris control circuit 10 and the focus control circuit 11. The iris control circuit 10 produces an iris control signal on the basis of the fed composite video signal PS under this operational control to supply it to the iris drive mechanism 16 comprising an iris drive motor, a gear mechanism and others, thereby controlling the opening and closing of the iris 6. Further, the focus control circuit 11 creates a focus control signal from the fed composite video signal PS under the operational control of the controller 12 to give it to the focus drive mechanism 17 comprising a focus lens drive motor, a gear mechanism and others so that the focus lens 7 is position-controlled in its optical-axis directions to conduct the autofocus control.

In addition, the lens block 1 is connected through the external control inputting connector 14 to the external controller 21 which supplies a zoom adjusting signal (zoom voltage) to the controller 12 of the control circuit section 8 in response to the manual operation. This zoom adjusting signal is further fed from the controller 12 to the zoom control circuit 9 where a zoom control signal is issued and given to the zoom lens drive mechanism 15. Whereupon, the zoom lens 5 is position-controlled in its optical-axis directions so that the zoom control is executed in accordance with the manual operation of the external controller 21.

Incidentally, through the manual operation, the external controller 21 can also perform the focus control, and a focus adjusting signal (focal voltage) due to this operation goes from the external controller 21 through the controller 12 to the focus control circuit 11. Further, as will be described later, means are provided to detect the positions of the zoom lens 5 and the focus lens 7, and hence, it is possible to confirm the positions of the lenses 5, 7 on the basis of a zoom lens position detection signal and a focus lens position detection signal acquired by these detection means.

In addition, as will be mentioned later, means are provided to detect the fact that the zoom lens 5 is at the end portion on the telephoto side (which will be referred hereinafter to as a telephoto end) and at the end portion on the wide-angle side (which will be referred hereinafter to as a wide-angle end), so that a zoom lens end detection signal obtained is led to the controller 12. On the basis of this zoom lens end detection signal, the controller 12 controls the zoom control circuit 9 to inhibit the output of the zoom control signal. In a similar way, a detection is also made in terms of the fact that the iris 6 takes the maximum open condition and the minimum open condition, and in response to the detection, an iris maximum/minimum open detection signal is generated to inhibit the output of the iris control signal from the iris control circuit 10. Further, a detection is made in terms of the fact that the focus lens 7 is at the infinitely far-end position and at the near-end position, and in response to the detection, a focus lens end detection signal is issued, thereby inhibiting the focus control circuit 11 from outputting the focus control signal.

In the above-described arrangement, although only one video signal transmission line is shown in FIG. 1 as the connecting line between the lens block 1 and the camera block 2, for the iris control and the focus control, in fact one power supply line and one grounding line (in this case, these are used in common for both the iris control and focus control) lie. That is, the number of connecting lines necessary for the iris control and the focus control results in being only three. Since the transmission of the detection signals on the zoom control, iris control and focus control are made within the lens block 1, the connecting lines therefor between the lens block 1 and the camera block 2 become unnecessary.

Moreover, the circuit characteristics of the control circuit section 8 and the respective drive mechanisms 15 to 17 are designed in conjunction with the optical characteristics and movement of the zoom lens 5, the iris 6 and the focus lens 7 and made to match with each other. In this embodiment, various lens blocks such as having different magnifications and not having the zoom function are selectively usable as the lens block 1. Even in this case, each of the lens blocks has the arrangement shown in FIG. 1. Thus, the lens block to be used is similarly designed such that the characteristics of the control circuit section 8 and the respective drive mechanisms 15 to 17 are set to match with each other, thereby achieving the respective control functions with a high accuracy.

Figure 2:
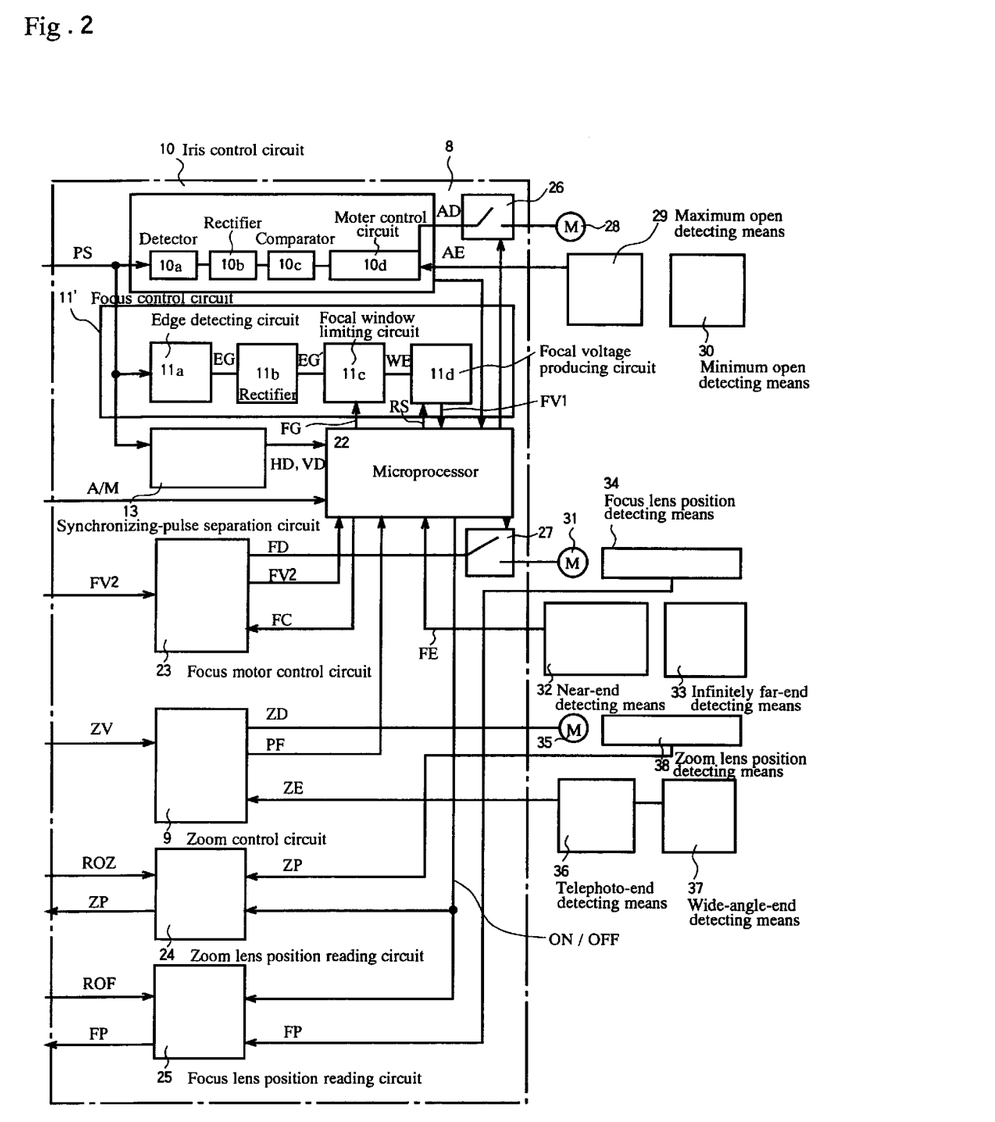
FIG. 2 is a block diagram showing an arrangement of a control circuit section of FIG. 1 video camera system.

FIG. 2 is a block diagram showing one concrete arrangement example of the control circuit section 8 shown in FIG. 1. In FIG. 2, the control circuit section 8 is made up of a detector 10a, a rectifier 10b, a comparator 10c, a motor control circuit 10d, a focus control circuit 11', an edge detecting circuit 11a, a full-wave rectifier 11b, a focal window limiting circuit 11c, a focal voltage producing circuit lid, a microprocessor 22, a focus motor control circuit 23, a zoom lens position reading circuit 24, a focus lens position reading circuit 25, switches 26, 27, an iris motor 28, a maximum open detecting means 29, a minimum open detecting means 30, a focus motor 31, a near-end detecting means 32, an infinitely far-end detecting means 33, a focus lens position detecting means 34, a zoom motor 35, a telephoto-end detecting means 36, a wide-angle-end detecting means 37, and a zoom lens position detecting means 38. Parts corresponding to those in FIG. 1 are marked with the same numerals.

In this illustration, a composite video signal PS from the camera block 2 (see FIG. 1) is given to the iris control circuit 10, the focus control circuit 11' and the synchronizing-pulse separation circuit 13. Synchronizing signals (a horizontal synchronizing signal HD and a vertical synchronizing signal VD) separated from the composite video signal in the synchronizing-pulse separation circuit 13 comes in the microprocessor 22 corresponding to the controller 12 in FIG. 1.

In the iris control circuit 10, the composite video signal PS comes in the detector 10a to detect its luminance signal, and this detection output is rectified in the rectifier 10b to obtain a dc voltage with an amplitude corresponding to the brightness. This dc voltage is fed to the comparator 10c to be compared with a preset reference voltage. The motor control circuit 10d produces an iris drive signal AD in accordance with the comparison output and supplies it through the switch 26 to the iris motor 28. Whereupon, in a state where the switch 26 is in the closed condition, when the level of the dc voltage from the rectifier 10b is higher than that of the reference voltage set in the comparator 10c, the motor control circuit 10d generates an iris drive signal AD to drive the iris motor 28 in the direction of closing the iris 6. On the other hand, when the level of the dc voltage from the rectifier 10b is lower than the same reference voltage, it issues an iris drive signal AD to drive the iris motor 28 in the direction of opening the iris 6.

Thus, in cases where the subject is bright and the luminance signal is too high in level, the iris 6 is driven in the closing direction to reduce the light reception quantity of the image pickup device 18 (see FIG. 1) so that the video signal decreases in level. On the other hand, in the case that the subject is dark and the luminance signal is too low in level, the iris is driven in the opening direction to increase the light reception quantity of the image pickup device 18 so that the video signal increases in level. With these operations, the iris control is conducted so that the level of the dc voltage from the rectifier 10b becomes equal to the aforesaid reference voltage, with the result that the level of the video signal is maintained to be substantially constant irrespective of the fluctuation of the brightness of the subject.

When the iris 6 comes into the minimum open condition, the minimum open detecting means 30 based upon a switch detects this minimum open condition, and when the iris 6 gets into the maximum open condition, the maximum open detecting means 29 based upon a switch detects this maximum open condition. A maximum/minimum open detection signal AE due to these detection is forwarded to the motor control circuit 10d. Whereupon, the motor control circuit 10d stops the iris motor 28 when the iris 6 reaches the maximum or minimum open condition to avoid the further rotation of the iris motor 28.

Figure 3:
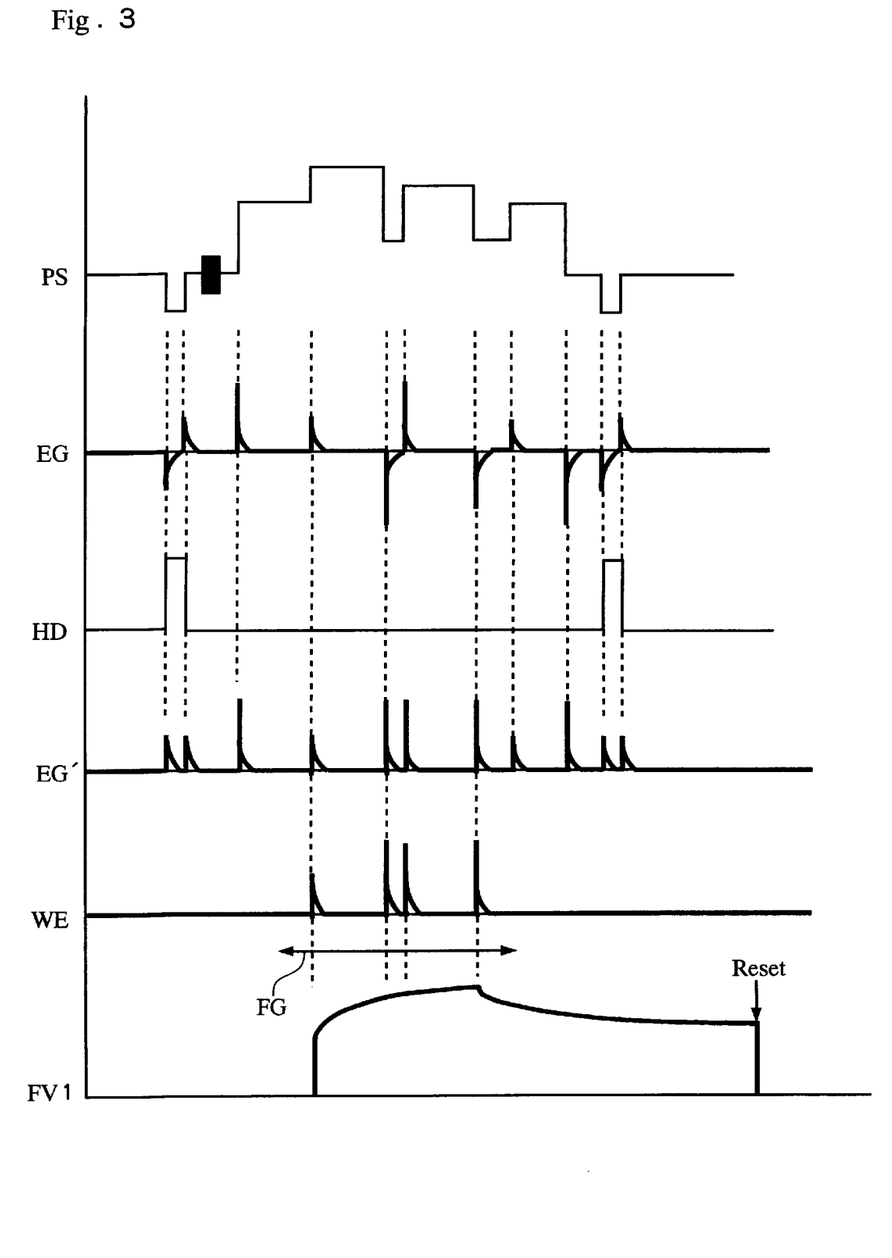
FIG. 3 is an illustration of waveforms at portions of a focus control circuit of the FIG. 2 control circuit section.

Subsequently, referring to FIG. 3, a description will be taken hereinbelow of a focus control circuit 11'. FIG. 3 is an illustration of waveforms of signals at portions of the focus control circuit 11', where the corresponding signals in the focus control circuit 11' are indicated with the same reference marks.

The composite video signal PS fed is differentiated in the edge detecting circuit 11a, thereby detecting its edge to produce an edge signal EG. The edge signal EG is rectified in the full-wave rectifier 11b. This rectification output EG' is sent to the focal window limiting circuit 11c which extracts a portion within a given area (i.e., a focal window) set at a central portion of the scene.

At this time, the microprocessor 22 produces a gate signal FG defining the focal window on the basis of the horizontal synchronizing signal HD and the vertical synchronizing signal VD from the synchronizing-pulse separation circuit 13, while the focal window limiting circuit 11c gates the rectification output EG' from the full-wave rectifier 11b through the use of the gate signal FG and extracts the rectification output EG' within the focal window. The reason for setting such a focal window under limitation is that the target subject is commonly placed at the central portion of the photographing scene and, hence, it is more preferable that the focusing is conducted at the central portion of the scene.

An output signal WE of the focal window limiting circuit 11c is fed to the focal voltage producing circuit 11d to peak-hold this signal WE, thereby producing a focal voltage FV1. This focal voltage FV1 is forwarded to the microprocessor 22. In this case, the focal voltage FV1 is obtained by holding the level of the edge signal with the highest level within the focal window. It is also appropriate to produce the focal voltage FV1 in a different way such as detecting the maximum edge level at every horizontal scanning line portion within the focal window and averaging the detection results.

Incidentally, when closer to the in-focus condition, the picture based on the composite video signal PS becomes clearer, and therefore, the level of the edge signal EG becomes higher, so that the level of the focal voltage FV1 also rises.

Now, let it be assumed that an automatic/manual switching signal A/M indicative of the instruction for an autofocus control mode due to the operation of the external controller 21 (see FIG. 1) is given through the external control inputting connector 14 (see FIG. 1) to the microprocessor 22. The microprocessor 22 sets the autofocus control mode for the autofocus control on the basis of the focal voltage FV1.

In this case, the focus control circuit 11', the focus motor control circuit 23 and a portion of the microprocessor 22 organize the focus control circuit 11 in FIG. 1. Secondly, a description will be made hereinbelow of the operation of this focus control circuit 11 in the autofocus control mode.

In this autofocus control mode, the microprocessor 22 creates a focus control signal FC on the basis of the focal voltage FV1 and gives it to the focus motor control circuit 23. The focus motor control circuit 23 produces a focus motor drive signal FD in accordance with the focus control signal FC, and when the switch 27 is in the closed condition, supplies it through this switch 27 to the focus motor 31. Whereupon, the focus motor 31 rotates by a given amount in the direction depending on the focus control signal FC, thereby moving the focus lens 7 (see FIG. 1) by a given amount along its optical axis in the direction of taking the in-focus condition, i.e., in the direction that the focal voltage FV1 comes to a maximum. At this time, the microprocessor 22 uses the vertical synchronizing signal VD as a timing signal to receive the focal voltage FV1 at every n fields (n is an integer being one or more), thereby producing the focus control signal FC. Thus, the focus lens 7 intermittently moves at every n fields.

Figure 4:
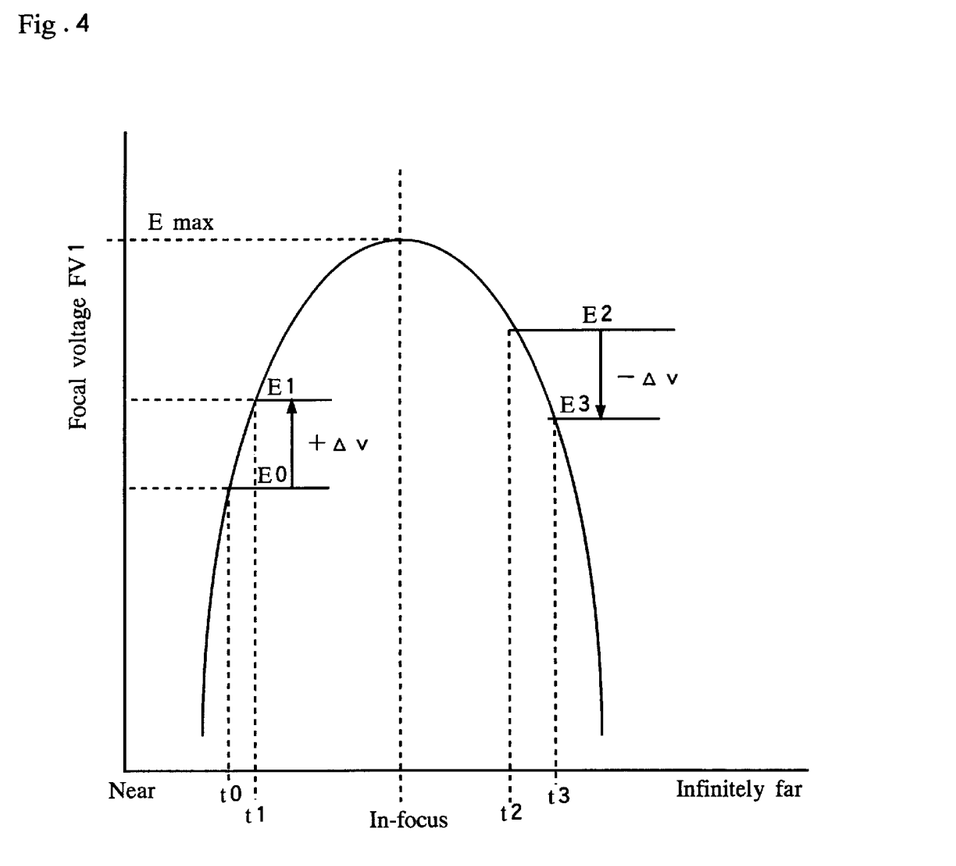
FIG. 4 is a graphic illustration useful for explaining the autofocus control by the FIG. 2 control circuit section.

Referring to FIG. 4, a description will be taken hereinbelow of one concrete example of the autofocus control. In FIG. 4, the horizontal axis represents the position of the focus lens 7 where the right side is the infinitely far side and the left side is the near side whereas the vertical axis indicates the focal voltage FV1.

In this illustration, when the focus lens 7 is at the in-focus position, the focal voltage FV1 assumes the peak (maximum) value $E_{max}$. When being shifted from this in-focus position in the near-side direction and the infinitely far-side direction, the peak voltage $E_{max}$ decreases.

In FIGS. 2 and 4, when receiving the voltage value E1 of the focal voltage FV1 from the focal voltage producing circuit 11d at time t1 (on getting the focal voltage FV1, the microprocessor 22 issues a reset signal RS to reset the focal voltage producing circuit 11d in preparation for the production of the next focal voltage FV1), the microprocessor 22 calculates the difference ΔV (ΔV=E1−E0) between this voltage value E1 and the voltage value E0 of the focal voltage FV1 taken at time t0 previous thereto by n fields (at time t1, the focus lens 7 is shifted by a given distance in one direction along its optical axis as compared with time t0). At this time, if E1>E0 and ΔV>0, this signifies that, owing to the movement of the focus lens 7 in that direction, the focal voltage FV1 approaches the peak value Emax, that is, the focus lens 7 is brought closer to the in-focus position. Thus, in this case, the microprocessor 22 gives a focus control signal FC to the focus motor control circuit 23 to further shift the focus lens 7 by the given distance in the same direction to again get the focal voltage FV1 there, thereby obtaining the voltage difference ΔV thereof from the voltage value E1 obtained at time t1. In this way, the focus lens 7 is successively shifted in the same direction as long as the voltage difference ΔV>0, so that the focus lens 7 reaches the in-focus point.

Due to this movement, if the focus lens 7 passes the in-focus point, comparing the voltage value E2 of the focal voltage FV1 at time t2 with the voltage value E3 of the focal voltage FV1 at time t3 delayed by n fields, the comparison results shows E2>E3, whereupon the difference ΔV=E3−E2 therebetween assumes the relation of ΔV<0. Thus, the microprocessor 22 can detect the fact that the focus lens 7 passes the in-focus point and, hence, sends a focus control signal FC to the focus motor control circuit 23 to move the focus lens 7 in the opposite direction, thereby coming into the voltage difference ΔV>0 condition. When the focus lens 7 again passes the in-focus point, the voltage difference ΔV becomes ΔV<0.

In consequence, the microprocessor 22 can find the positions of the focus lens 7 on the basis of the fact that the voltage difference ΔV takes plus and minus values, and produces a focus control signal FC in a manner that the intermediate point between the two positions taking the plus and minus values is set as the in-focus point, thereby placing the focus lens 7 at the in-focus point.

Incidentally, although the above description has been made in the case that the focus lens 7 is shifted from the near side to the infinitely far side, the same operation works even if the focus lens 7 is moved from the infinitely far side to the near side. Further, when the voltage difference ΔV=0, this means that the focus lens 7 is at the in-focus point. Accordingly, the focus lens 7 stays at this position.

The near-end detecting means 32 detects the fact that the focus lens 7 reaches the near end while the infinitely far-end detecting means 33 detects that the focus lens 7 reaches the infinitely far end. The focus lens end detection signals FE from these means 32, 33 are forwarded to the microprocessor 22. When receiving these focus lens end detection signals, the microprocessor 22 stops to supply the focus control signal FC to the focus motor control circuit 23, thus stopping the focus motor 31 to inhibit the further rotation thereof.

The above relates to the operations in the autofocus control mode, while in this embodiment it is possible to manually perform the focus control through the manual operation of the external controller 21 (see FIG. 1). A description will be taken hereinbelow of this manual mode.

Now. Bet it be assumed that, due to the operation of the external controller 21, an automatic/manual switching signal A/M indicative of the manual focus control mode is given through the external control inputting connector 14 (see FIG. 1) to the microprocessor 22. The microprocessor 22 sets the manual focus control mode for conducting the manual focus control. In this manual focus control mode, the microprocessor 22 takes a condition to receive a focal voltage FV2 from the focus motor control circuit 23 in place of the focal voltage FV1 from the focal voltage producing circuit 11d.

When undergoing the manual focusing operation, the external controller 21 produces a focal voltage FV2 corresponding to this operation which in turn, is fed through the external control inputting connector 14 and the focus motor control circuit 23 to the microprocessor 22. The microprocessor 22 produces a focus control signal FC on the basis of the focal voltage FV2 due to the manual operation and supplies it to the focus motor control circuit 23. Thus, the focus motor 31 is rotated by a given amount in one direction in accordance with the manual operation in the external controller 21 so that the focus lens 7 is moved by a given distance in one direction. In this way, it is possible to accomplish the focus control.

Also in the case of this manual focus control, when the focus lens 7 arrives at the near end or the infinitely far end, the near-end detecting means 32 or the infinitely far-end detecting means 33, comprising a switch, detects this arrival, and the microprocessor 22 stops to give the focus control signal FC to the focus motor control circuit 23.

Secondly, a description will be made hereinbelow of the zoom control. Since in this embodiment the video camera system is of the observational type, the zoom control depends upon the manual operation in the external controller 21 (see FIG. 1).

In FIG. 2, a zoom voltage ZV corresponding to the manual operation in the external controller 21 is sent through the external operation inputting connector 14 (see FIG. 1) to the zoom control circuit 9. The zoom control circuit 9 produces a zoom motor drive signal ZD on the basis of the zoom voltage ZV and gives it to the zoom motor 35. Whereupon, the zoom motor 35 is rotated by a given amount in one direction in accordance with the zoom voltage ZV so that the zoom lens 5 moves by a given amount in the telephoto direction or in the wide-angle direction, thereby accomplishing the zoom control.

In addition, on receiving the supply of the zoom voltage ZV from the external controller 21, the zoom control circuit 9 generates a focus control inhibition signal PF to forward it to the microprocessor 22 for at least the time period till the completion of the zoom control, i.e., the termination of the movement of the zoom lens 5, after the supply of the zoom voltage ZV. Thus, when being in the aforesaid autofocus control mode, the microprocessor 22 stops the autofocus control operation during at least the zoom control operation and resumes the autofocus control in response to the completion of the zoom control. Whereupon, the malfunction on the autofocus control at the zoom control is preventable and the in-focus condition is quickly attainable under the condition of a new zoom magnification due to the zoom control.

For instance, the telephoto-end detecting means 36 and the wide-angle-end detecting means 37, for example based upon a switch, detect the facts that the zoom lens 5 reaches the telephoto end and the wide-angle end, respectively. The zoom lens end detection signal ZE due to this detection comes in the zoom control circuit 9. The zoom control circuit 9 inhibits the further rotation of the zoom motor 35 in response to the zoom lens end detection signal ZE.

In this embodiment, the external controller 21 is made to be capable of reading the positions of the focus lens 7 and the zoom lens 5.

More specifically, in FIG. 2, the focus lens position detecting means 34 comprising a potentiometer is provided to always detect the position of the focus lens 7 and to generate a focus lens position detection signal FP which in turn, is fed to the focus lens position reading circuit 25. In a similar way, the zoom lens position detecting means 38 composed of a potentiometer is provided to always detect the position of the zoom lens 5 and to generate a zoom lens position detection signal ZP which in turn, is fed to the zoom lens position reading circuit 24. The focus lens position reading circuit 25 and the zoom lens position reading circuit 24 get into the actuating conditions in accordance with a switching signal ON/OFF from the microprocessor 22 when the automatic/manual switching signal A/M occurring due to the manual operation in the external controller 21 is indicative of the manual focus control mode, thereby reading the focus lens position detection signal FP from the focus lens position detecting means 34 and the zoom lens position detection signal ZP from the zoom lens position detecting means 38, respectively.

Although in the description the focus lens position reading circuit 25 and the zoom lens position reading circuit 24 are in deactuating conditions when being in the autofocus control mode, it is also possible that, if necessary, the focus lens position reading circuit 25 and the zoom lens position reading circuit 24 are always put into actuating conditions to allow the positional information on the focus lens 7 and the zoom lens 5 to be always readable.

Now, assuming that the manual focus control mode is placed into effect, if an operation is conducted to read the position of the focus lens 7 in the external controller 21, a reading command signal ROF is supplied from the external controller 21 through the external control inputting connector 14 to the focus lens position reading circuit 25. Whereupon, the focus lens position reading circuit 25 supplies the focus position detection signal from the focus lens position detecting means 34 to the external controller 21. The external controller 21 makes a decision about the position of the focus lens 7 on the basis of this focus lens position detection signal FP, and it is possible that the positional information on the focus lens 7 at that time is stored through a given operation of the external controller 21 and the stored positional information is fed as a focal voltage FV2 to the focus motor control circuit 23 when necessary.

Similarly, in the case of being in the manual focus control mode, when the operation is conducted in the external controller 21 for reading the position of the zoom lens 5, a reading command signal ROZ is fed from the external controller 21 through the external control inputting connector 14 to the zoom lens position reading circuit 24. The zoom lens position reading circuit 24 transfers a zoom lens position detection signal ZP from the zoom lens position detecting means 38 to the external controller 21. Accordingly, the external controller 21 can make a decision about the position of the zoom lens 5 on the basis of the zoom lens position detection signal ZP, with the positional information on the zoom lens 5 being stored through a given operation in the external controller 21. The stored positional information can be fed as a zoom voltage ZV to the zoom control circuit 9 when necessary.

In a state where the positional information on the focus lens 7 is stored in the external controller 21, if this positional information is fed as a focal voltage FV2 to the focus motor control circuit 23 through the aforesaid predetermined operation, the focus lens 7 is automatically set to the position corresponding to this positional information by the aforesaid operation. Accordingly, through the operation of the external controller 21 taking the manual focus control mode, the in-focus condition is obtainable by watching a monitoring screen (not shown). At this time, the positional information on the focus lens 7 is taken from the focus lens position detection signal FP and stored in the external controller 21. Thereafter, when being under the same photographing condition, the manual focus control mode is set so that the positional information on the focus lens 7 is forwarded to the focus motor control circuit 23 through a given operation of the external controller 21, thereby automatically moving the focus lens 7 to the in-focus point. This operation will be referred hereinafter to as a preset operation for the in-focus condition.

In a similar way, in a state where the positional information on the zoom lens 5 is stored in the external controller 21, when this positional information is fed as a zoom voltage ZV to the zoom control circuit 9 through the aforesaid given operation, the operation is conducted as mentioned above so that the zoom lens 5 is automatically set to the position corresponding to this positional information. Accordingly, through the operation of the external controller 21 assuming the manual focus control mode, a desired zoom condition is attainable while watching the monitoring screen. At this time, the positional information on the zoom lens 7 is taken from the zoom lens position detection signal ZP and stored in the external controller 21. Thereafter, when being under the same photographing condition, the manual focus mode is set so that the positional information on the zoom lens 5 stored is fed to the zoom control circuit 9 through a given operation of the external controller 21, thereby automatically shifting the zoom lens 5 to a position accomplishing a desired zoom condition. This operation will be referred hereinafter to as a preset operation for a zoom magnification.

The in-focus condition preset operation and the zoom magnification preset operation are particularly useful for the observational video camera system.

That is, in cases where an observational type video camera system is located in a given space to monitor that space, no problem particularly occurs if monitoring one specific portion within the space. However, there is also a case of monitoring a plurality of portions therein. In this case, when using one video camera system, that video camera is installed at a specific spot in a state of being placed on a movable base so that the photographing direction of the camera can be switched by the remote control to photograph the respective portions to be monitored.

In general, the respective portions to be monitored are different from each other in distance from the installation spot. Accordingly, when switching the portion to be monitored by the video camera system, the distance to the portion to be monitored differs from the previous distance and, hence, the out-of-focus condition occurs and the setting to the in-focus condition again becomes necessary. Although the in-focus condition is attainable by the autofocus control operation, it takes some length of time, with the result that, immediately after the switching, the photography is done in the out-of-focus condition.

This also applies to the zoom magnification. When the difference in distance from the installation spot of the video camera system between the portion monitored and the portion to be monitored next is remarkable, the sizes of the subject pictures taken differ from each other, which creates a problem on monitoring. Although it is possible to preferably adjust the zoom magnification by an operation when the portion to be monitored is changed, it is considerably troublesome and it needs some length of time so that, immediately after the switching, the pictures to be photographed are affected by the adjusting operation of the zoom magnification.

For these reasons, in this embodiment, the aforesaid in-focus condition preset operation and the aforementioned zoom magnification preset operation are done to previously make the external controller 21 store the appropriate positional information on the focus lens 7 and the adequate positional information on the zoom lens 5 at every portion to be monitored. Further, the external controller 21 controls the movable base to change the photographing direction (monitoring direction) of the video camera system for the switching of the portion to be monitored. At this time, the external controller 21 performs the setting to the manual focus control mode for a given period of time, and further supplies the positional information on the focus lens 7 and the zoom lens 5 as the focal voltage FV2 and the zoom voltage ZV corresponding to the portion to be newly monitored to the focus motor control circuit 23 and the zoom control circuit 9, respectively.

Thus, on switching to the portion to be newly monitored, the in-focus condition is substantially simultaneously achievable, and the photography becomes possible with the zoom magnification suitable for this portion.

In the case of conducting the in-focus condition preset operation in the manual focus control mode, it takes some time, and hence, when the number of portions to be monitored while switched is large, it takes time for the setting at the respective portions, so that a considerable length of time becomes necessary as a whole.

For eliminating this problem, in this embodiment, as described before, the focus lens position reading circuit 25 and the zoom lens position reading circuit 24 are placed into the actuating conditions even in the autofocus control mode. First, the in-focus operation is conducted in the autofocus control mode, and the focus lens position reading circuit 25 reads the positional information on the focus lens 7 when reaching the in-focus condition, and makes the external controller 21 store it so that the following preset operation for the focus lens 7 is conducted on the basis of the stored positional information. According to this method, the time required for the setting at the preset operation becomes drastically short.

Furthermore, in the case of a video camera system which is made to monitor only one portion within a space, the above-described in-focus condition and zoom magnification preset operations are unnecessary, and this invention relates to a video camera system including a detachable lens block described before. In this case, the zoom lens position reading circuit 24, the focus lens position reading circuit 25, the focus lens position detecting means 34, and the zoom lens position detecting means 38 in FIG. 2 may be removed and the zoom operation becomes unnecessary, while a telephoto lens with a given fixed zoom magnification is put to use.

In this embodiment, various lens blocks with the above-described arrangements are attachable and detachable to and from one camera block 2, so that the detachable lens block can be selected in accordance with the space to be monitored.

As described before with reference to FIG. 2, when the zoom operation is conducted through the external controller 21 in the autofocus control mode, the zoom control circuit 9 supplies the focus control inhibition signal PF to the microprocessor 22 so that the autofocus control is interrupted during the zoom control. In addition, this embodiment is made to avoid the concurrent execution of the iris control and the autofocus control. Therefore, the switches 26, 27 are provided and the microprocessor 22 controls the ON/OFF timings of these switches 26, 27.

If drive currents concurrently flow in the iris motor 28 and the focus motor 31, the peak power increases to impose a great load on the power supply. In this embodiment, the iris control operation and the autofocus control operation are alternately done, thus eliminating this problem.

The motor control circuit 10d of the iris control circuit 10 issues an iris time signal AS indicative of the performance of the iris control operation concurrently with producing an iris drive signal AD in accordance with the variation of luminance. When receiving the iris time signal AS therefrom, the microprocessor 22 closes the switch 26 for the execution of the iris control while opening to the switch 27 to inhibit the autofocus control. If the supply of the iris time signal AS comes to an end, the microprocessor 22 opens the switch 26 while closing the switch 27, thereby executing the autofocus control.

Due to the operations of these switches 26, 27, the manual focus control is also inhibited during the iris control.

Although in the above description the iris control is conducted in preference to the focus control, it is also possible that the focus control is done preferentially. However, if the focus control is done after a given luminance is obtained, the focus control becomes higher in accuracy. For this reason, it is preferable that the iris control is executed prior to the focus control.

As obvious from the above-described arrangements, in this embodiment, the focus control signal FC, the focus drive signal FD and the focus lens end detection signals FE, the near-end detecting means 32 and the infinitely far-end detecting means 33 issue when the focus lens 7 is at the near end and the infinitely far end, are sent and received within the detachable lens block 1, and therefore, there is no need to place the transmission lines for the signals necessary for the autofocus control function between the detachable lens block 1 and the camera block 2.

In addition, in terms of the iris control function, the iris drive signal AD and the maximum/minimum open detection signals AE the maximum open detecting means 29 and the minimum open detecting means 30 generate when the iris 6 takes the maximum and minimum open conditions are sent and received within the detachable lens block 1, and hence, it is unnecessary to provide the transmission lines for these signals between the detachable lens block 1 and the camera block 2.

Moreover, for the zoom control function, the zoom drive signal ZD and the zoom lend end detection signals ZE, the telephoto-end detecting means 36 and the wide-angle-end detecting means 37 generate when the zoom lens 5 at the telephoto end and the wide-angle end, are sent and received within the detachable lens block 1, with the result that the transmission lines for the transmission of these signals are not required to be provided between the detachable lens block 1 and the camera block 2.

Therefore, according to this embodiment, as the connecting lines to be provided between the detachable lens block 1 and the camera block 2, there are only required one transmission line 20 for the composite video signal PS and the power supply line and grounding line used in common to the zoom function, the iris function and the focus function. That is, the number of connecting lines necessary results in being only three.

In this embodiment, the transmission lines for the automatic/manual switching signal A/M from the external controller 21, the focus voltage FV2 due to the manual operation, the zoom voltage ZV and reading command signals ROF, ROZ are connected to the detachable lens block 1. On the other hand, in the case that the lens block and the camera block are designed to be detachable from each other like the prior video camera system, they may be connected to the camera block side. The difference therebetween is only concerned with the connection position.

Furthermore, since the control circuit section for the respective control functions is situated within the lens block, the control circuit section can be made to match with the characteristics of the focus lens, the zoom lens and the iris with a high accuracy. Accordingly, even if the characteristic of the lens differs among the lens blocks, in each lens block the control signals matching with the characteristics of the respective lenses used therein are obtainable. Incidentally, in the case of the detachable lens block according to the embodiment, since the autofocus control can be done in a state where the appropriate luminance level is accomplished by the iris control and the circuit characteristic of the autofocus control circuit matches with the characteristic of the focus lens drive mechanism, it is possible to execute the autofocus control with a high accuracy. In addition, in the case of the detachable lens block having the arrangement according to this embodiment, even if their kinds are different from each other, the same effects are obtainable. For this reason, regardless of the interchange of the detachable lens block according to this embodiment to be used together with a camera block, excellent autofocus control is always feasible.

As described above, according to this invention, it is possible to sharply decrease the number of connecting lines between the camera block and the lens block, thereby reducing the sizes of the connectors and thinning the bundle of the connecting lines, which allows the size-reduction of the video camera system. In addition, according to this invention, since in addition to the lenses and the iris drive mechanism the control circuits such as the focus control circuit are provided within the lens block, the matching in characteristic between the drive mechanism and the control circuit is achievable with a high accuracy, and the control such as focus control can be done with a high accuracy.

It should be understood that the foregoing relates to only a preferred embodiment of the present invention, and that it is intended to cover all changes and modifications of the embodiment of the invention herein used for the purpose of the disclosure, which do not constitute departures from the spirit and scope of the invention.

What is claimed is:

1. A detachable lens block having a structure attachable and detachable to and from a camera block, said detachable lens block comprising a focus lens drive mechanism for driving a focus lens and an autofocus control section for executing autofocus control, and said autofocus control section receiving a video signal outputted from said camera block to control said focus lens drive mechanism on the basis of said video signal for the execution of said autofocus control.

2. A detachable lens block as defined in claim 1, wherein said autofocus control section is equipped with focal voltage producing means for producing a focal voltage from said video signal, and said autofocus control section moves said focus lens in its optical-axis directions through said focus lens drive mechanism and determines an in-focus point when said focal voltage varying in accordance with the movement of said focus lens reaches a peak value.

3. A detachable lens block as defined in claim 1, further comprising an iris drive mechanism for optically adjusting an aperture of a lens and an autoiris control section for automatically controlling said iris drive mechanism, so that automatic iris control is executed on the basis of said video signal outputted from said camera block.

4. A detachable lens block as defined in claim 3, wherein a power supply to said autofocus control section and a power supply to said autoiris control section are used in common.

5. A detachable lens block as defined in claim 4, wherein a motor for said autofocus control section and a motor for said autoiris control section are successively driven.

6. A detachable lens block as defined in claim 1, further comprising autofocus control switching means for switching between focus control by an operation of an external focus control means and focus control by an operation of an internal autofocus control means, so that said focus lens drive mechanism is controllable by said external focus control means and said internal autofocus control means.

7. A video camera system comprising a detachable lens block as defined in any one of claims 1 to 6.

* * * * *

UNITED STATES PATENT AND TRADEMARK OFFICE
CERTIFICATE OF CORRECTION

PATENT NO. : 6,172,709

DATED : January 9, 2001

INVENTOR(S): Shiro YAMANO, et al.

It is certified that an error appears in the above-identified patent and that said Letters Patent is hereby corrected as shown below:

On the title page, Item (73), the 1st Assignee's name is listed incorrectly. Item (73) should read as follows:

(73) Assignees: Yamano Optical, Ltd., Machida;
Hitachi Video and Information System, Inc., Yokohama, both of (JP)

Signed and Sealed this

Eighth Day of May, 2001

Attest:

NICHOLAS P. GODICI

Attesting Officer

Acting Director of the United States Patent and Trademark Office